United States Patent [19]

Batchelor

[11] Patent Number: 4,614,168

[45] Date of Patent: Sep. 30, 1986

[54] CONTROL VALVE FOR DUAL FUEL OPERATION OF AN INTERNAL COMBUSTION ENGINE

[75] Inventor: William H. Batchelor, Jensen Beach, Fla.

[73] Assignee: Propane Carburetion Systems, Inc., Stuart, Fla.

[21] Appl. No.: 724,831

[22] Filed: Apr. 19, 1985

Related U.S. Application Data

[62] Division of Ser. No. 576,428, Feb. 2, 1984, Pat. No. 4,535,728.

[51] Int. Cl.$^4$ ............................................... F02B 3/00
[52] U.S. Cl. ................................ 123/27 GE; 123/527; 137/514.7
[58] Field of Search ................. 123/525, 527, 27 GE; 251/48; 137/514.7, 98, 881

[56] References Cited

U.S. PATENT DOCUMENTS 2,311,315  2/1943  Smith .................................. 123/527
4,440,137  4/1984  Lagano et al. ...................... 123/527

Primary Examiner—Craig R. Feinberg
Assistant Examiner—David A. Okonsky
Attorney, Agent, or Firm—Bacon & Thomas

[57] ABSTRACT

A control system for a dual fuel engine using primary diesel fuel and supplemental gas fuel such as propane or natural gas includes a control valve that controls supplemental fuel mixing with intake air by using an air deflectable member that controls the position of a valve controlling the admission of supplemental gas to the engine intake airstream. A damper is provided on the air flow responsive member to improve valve operation and a lost motion connection is provided between the air flow responsive member and the control valve element to permit independent movement of the elements. Normal flow of supplemental fuel to the control valve is further modulated in response to certain engine operating conditions using an engine condition comparator that generates a control signal used by the supplemental fuel pressure regulator to further modulate the supply of supplemental fuel to the intake airstream. The system includes a supplemental fuel shut-off system that restores full primary diesel fuel flow to the engine when the supply of supplemental fuel approaches depletion.

8 Claims, 6 Drawing Figures

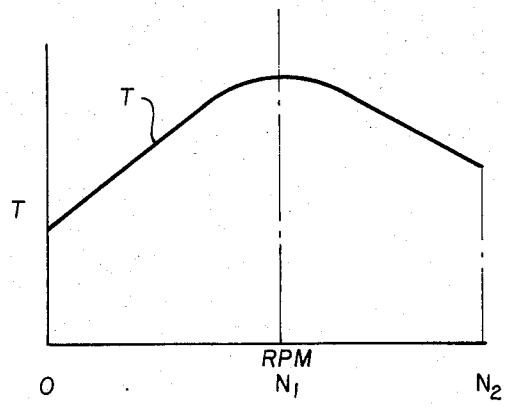
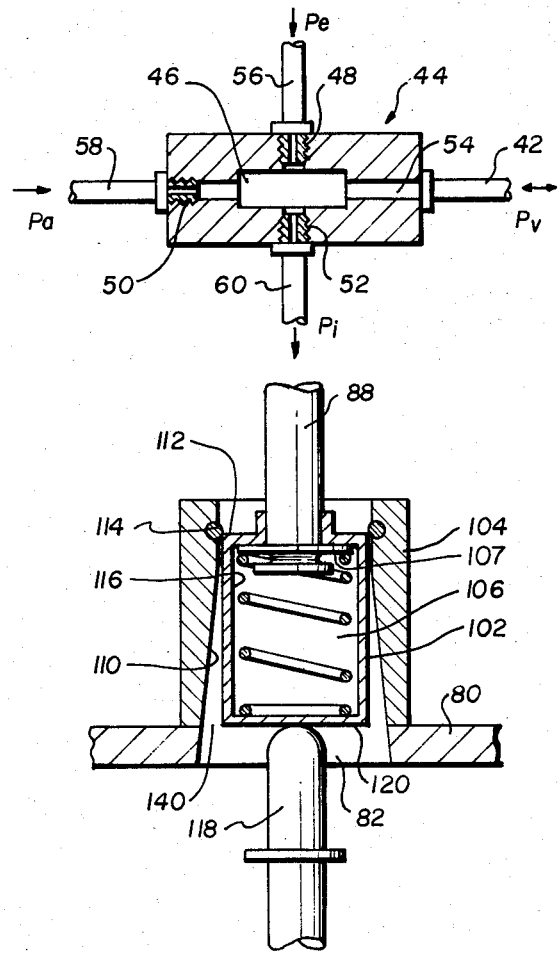

CONTROL VALVE FOR DUAL FUEL OPERATION OF AN INTERNAL COMBUSTION ENGINE

This application is a division of application Ser. No. 576,428, filed Feb. 2, 1984 and now U.S. Pat. No. 4,535,728.

BACKGROUND OF THE INVENTION

1. Field of the Invention

This invention relates to a control valve for dual fuel (liquid and gaseous) supply system for an internal combustion engine.

2. Description of the Prior Art

The present invention is concerned with a control valve for supplying a gaseous supplemental fuel to the intake airstream of an internal combustion engine, in particular a diesel engine, in suitable proportions to provide adequate total heat input to the engine to enable the same to produce the total power output demanded of it while using less of its primary liquid fuel (diesel fuel). A control system for the valve regulates its operation so that the gaseous fuel is supplied in suitable quantity to achieve the desired porportions of air to supplemental gaseous fuel despite varying engine operating conditions.

The basic control valve used in the invention is described in commonly owned U.S. Pat. No. 4,440,137. Basically, the valve responds directly to intake air flow to proportion supplemental fuel into the airstream under all operating conditions. Prior art examples of this type of valve can be observed in U.S. Pat. Nos. 2,311,315, 3,948,224 and 2,150,764, wherein direct air flow responsive elements are deflected by a moving intake airstream and wherein such movement is used to position a supplemental gaseous fuel valve to regulate admission of the gaseous fuel into the inlet airstream.

The prior art known to applicant is believed not to be concerned, however, with a control valve having a control system capable of adjusting the basic supplemental fuel supply system to accomodate various torque curves of different diesel engines, nor is it known to be concerned with damping sudden motion of the air flow responsive member of the valve.

SUMMARY OF THE INVENTION

This invention relates to a supplemental fuel mixer and control valve for use in combination with a primary liquid fuel supply system for an internal combustion engine, and in particular, a diesel fuel engine. The control valve and its associated control system allows the use of lower cost supplemental gaseous fuel, for example, propane or natural gas, in combination with the use of a liquid fuel, for example, diesel fuel.

It is to be noted that when further reference is made herein to "propane," it should be understood that this term is meant to include natural gas and other generally equivalent gaseous fuels as well.

It is known that under certain circumstances the use of an auxiliary or supplemental gaseous fuel increases the efficiency of a diesel engine, due at least in part to the fact that the addition of gaseous fuel causes a more complete combustion of the diesel fuel which is supplied to the diesel engine. Due to the more complete combustion of the diesel fuel, when mixed with, for example, propane or other natural gas, pollution is greatly reduced by reducing the amount of unburned diesel fuel previously passed through the exhaust system. This, of course, is an important ecological consideration in the selection of suitable engine performance characteristics for a large fleet of trucks which would otherwise run exclusively on diesel fuel and introduce a great deal of pollutants into the atmosphere.

The control valve according to this invention is designed to supply the supplemental fuel, for example in the form of propane or natural gas, after it has been vaporized, into the intake air of the engine and the valve also meters the amount of gas introduced into the intake air of the engine in response to flow of intake air to the engine.

Therefore, a concept of the present invention relates to the control valve for introducing a supplemental gas fuel supply to a diesel engine which is also provided with a primary liquid fuel supply. The control valve includes a valve housing which has an air duct extending through the housing and having inlet and outlet ends, with the housing arranged to be connected to the air intake of the engine so that the outlet of the air duct is in communication with engine intake air. A movable air flow responsive member, in the air duct of the valve, is arranged to be deflected in a first direction by forces resulting from air flowing through the duct from the inlet to the outlet end. The movable air flow responsive member is resiliently biased by a spring means in a direction opposite to the direction in which it is deflected by the moving airstream. The spring means functions in conjunction with a motion damping means so as to retard sudden motion of the air flow reaction member, particularly closing motion.

The motion damping means is preferably a telescoping pneumatic damper, whereby sudden motion of the air flow reaction member is resisted by controlled compression and expansion of air in the damper so as to prevent the sudden motion of the control valve in response to sudden changes in intake air velocity.

The control valve of the present invention also utilizes an improved lost motion connection between the air flow responsive member and the valve element of the control valve so as to allow the valve element to be movable between open and closed positions independent of movement of the air flow responsive member. An element of the control valve functions to maintain the valve element in a closed position so as to prevent the inflow of supplemental gaseous fuel into the intake air when intake air velocity is high but the speed controller (throttle) of the engine is at or approaching the idle position. The valve element therefore is independently movable with respect to, and functions without interference with, the movement of the air flow responsive member up to a predetermined amount of travel of the air flow responsive member. Accordingly, the air flow responsive member may assume a deflected position in response to air flowing to the engine air intake conduit without corresponding movement of the valve element of the control valve.

The control valve of the present invention provides an improved lost motion connection between the valve element and the connection to the air flow responsive member, utilizing a sliding connection between a connector element and a cylindrical valve element, on the one hand, and a spring between the valve element and the connection to the air flow responsive member on the other hand. The former transmits closing movement to the valve, and the latter transmits opening movement thereto.

In association with the control valve a fluid control arrangement is provided for adjusting the flow of the supplemental, gaseous fuel to the engine to provide a "fine tuning" control of the basic gas fuel supply system to enable the basic system to be adapted to various engine systems, i.e., engines with different fuel flow and torque characteristics. The control system functions by controlling the basic supply of the supplemental gaseous fuel to the control valve based upon the creation of a "net control signal" which is derived from various engine operating parameters from which the net control signal is derived.

Also in association with the valve there is provided a multi-chamber vaporizer/pressure regulator located between the source of the supplemental fuel and the control valve. The vaporizer/regulator is designed to be responsive to the net control signal so as to modulate the amount of vaporized supplemental fuel which is normally supplied to the control valve for various engines having different fuel supply and control systems.

An additional feature disclosed is an automatic control system for restoring full primary liquid fuel flow to the engine and cutting off the supplemental, gaseous fuel flow supply when the supplemental fuel supply is at or near depletion.

BRIEF DESCRIPTION OF THE DRAWINGS

FIG. 4 is a graph depicting a torque curve of a typical, modern diesel engine;

FIG. 5 is a side view, in partial cross section, of the condition comparator block used in the system of FIG. 1 to produce a net control signal; and, FIG. 6 is a partial, side view, in partial cross section, of the gas fuel valve element used in the control valve of FIG. 2.

DETAILED DESCRIPTION OF THE PREFERRED EMBODIMENT

Figure 1:
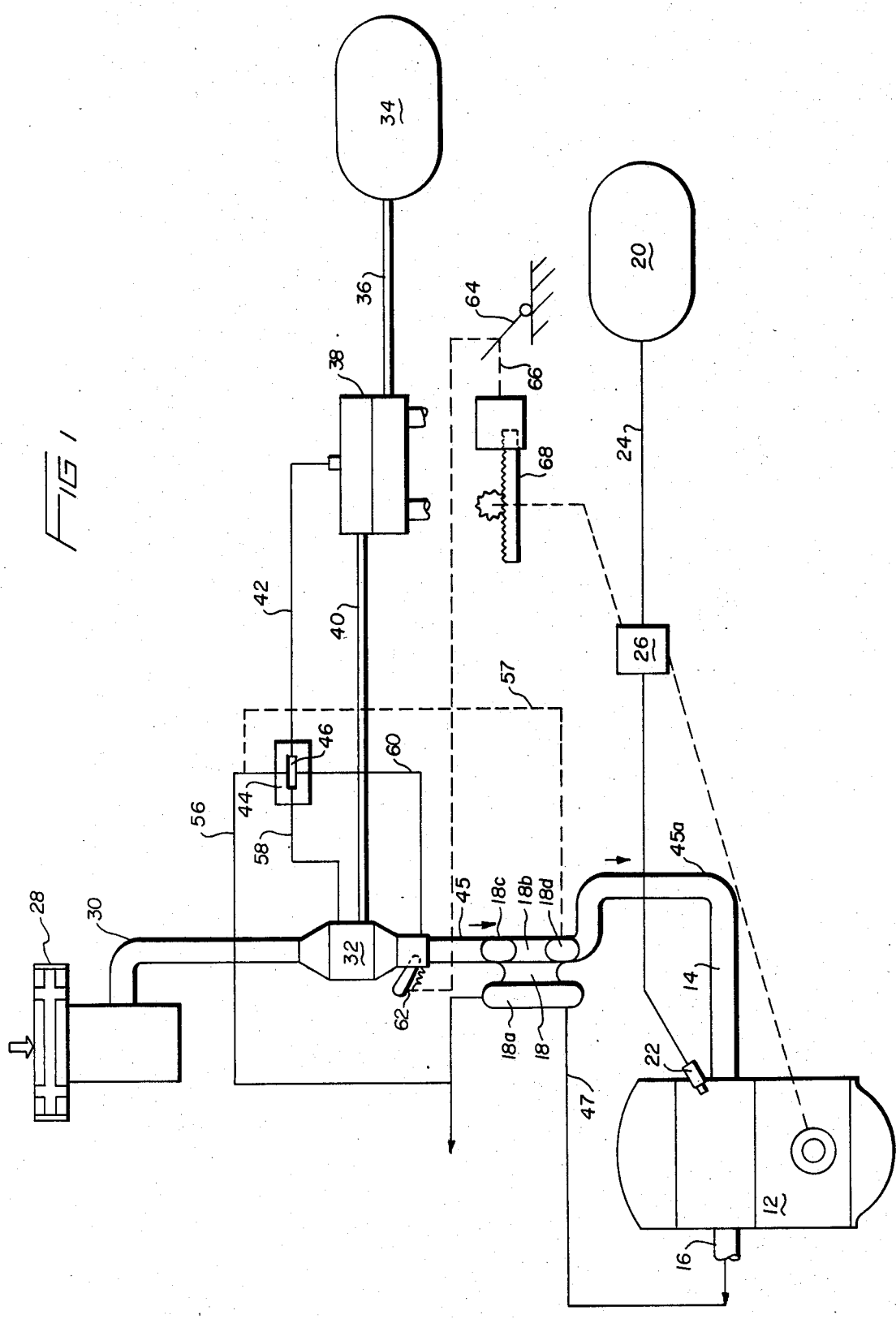
FIG. 1 is a schematic representation of a dual fuel flow control system.

Reference numeral 10 in FIG. 1 indicates a schematic representation of a preferred embodiment of a dual fuel control system constructed according to the present invention. Internal combustion engine 12, in this case a turbocharged diesel fuel engine, includes an air intake conduit or duct 14 and an exhaust duct 16. An exhaust gas driven turbocharger 18 is connected to the intake duct 14. The turbocharger, having an exhaust driven side 18a and an intake air compression side 18b, pressurizes the intake air in the intake duct in accordance with well known prinicples. A supply tank 20 contains liquid fuel, of the diesel fuel type in this embodiment, and is supply source for the liquid diesel fuel to a fuel injection system of the engine.

The fuel injection system is schematically represented by fuel line 24 with a pump 26 interposed between the supply tank 20 and a fuel injector 22. Of course, it it understood that the engine would have a plurality of such injectors 22 which would receive the pressurized liquid fuel from the supply pump 26.

An air cleaner 28 is mounted on the diesel engine 12 in any well-known manner and is adapted to deliver air so as to ensure delivery of clean air for combustion within engine 12 and also to deliver the intake air by an intake duct 30 to the control valve 32. The unit 32 is designed to meter a supplemental, gaseous fuel supply into the intake air in proportion to the air demanded by the engine as will be explained in further detail below with reference to FIGS. 2 and 6.

A supplemental gas fuel supply is indicated at 34 and is connected by conduit 36 to a vaporizer/pressure regulator 38 upstream of the control valve 32. After vaporization of the supplemental fuel, the supplemental fuel at an appropriate pressure is delivered by conduit 40 to the supplemental fuel control valve 32. The control valve 32 is arranged so as to receive all of the intake air demanded by the diesel engine and, when operational, transmits the air/supplemental fuel vapor mixture to the turbocharger 18 via intake air conduit 45. In this embodiment, the turbocharger is driven by exhaust gas from the exhaust duct 16 of the engine via a conduit 47. The air compression side 18b, of the turbocharger 18, supplies the supplemental fuel/air mixture to the intake manifold 14 with the degree of compression of the mixture or intake air determined by the speed of the turbocharger, which is proportional substantially to the rate of flow of engine exhaust gases. The compression side 18b of the turbocharger 18 includes an inlet end 18c and a pressurized outlet end 18d in communication with portion 45a of intake air conduit 45 leading from the turbocharger to the engine 12.

The vaporizer/pressure regulator 38 receives a primary (conventional) suction control signal $P_p$ from the control valve 32 via line 40 and (in accordance with this invention) a secondary "net control signal" $P_v$ is communicated by line 42 from a condition comparator bock 44, illustrated in more detail in FIG. 5. In this embodiment, comparator block 44 has a central pressure comparator chamber 46 therein which communicates with a port 54 and three flow proportioning orifices (flow restrictors) 48, 50, and 52. Port 54 is connected with open conduit 42 which leads to the net control signal chamber 146 (see FIG. 3) in vaporizer/pressure regulator 38 and delivers a net control signal in the form of a pressure $P_v$ to the chamber 146. The orifice 48 is connected, by open conduit 56, either with the exhaust duct 47 at a location downstream of the turbocharger 18 or, in the alternative, by open conduit 57 with the pressure output end 18d of turbocharger 18, for receiving an exhaust gas rate of flow signal in the form of a pressure $P_e$ therefrom. The orifice 50 is connected with open conduit 58 and receives an ambient or reference intake duct signal in the form of pressure $P_a$ from a location in the intake duct 30 upstream of the control valve 32 and downstream of the air cleaner 28. The orifice 52 is connected by an open conduit 60 with the air intake duct 30 at a point downstream of the mixer valve 32 and upstream of the turbocharger 18, to produce a pressure signal $P_i$, which, in conjunction with pressure signal $P_a$, produces an intake air velocity (i.e., mass flow rate) signal of pressure $P_i$ at the approximate location shown. The comparator chamber in block 44 thus receives three input signals, $P_a$, $P_e$ and $P_i$ through proportioning orifices 50, 48, and 52, respectively, which are variable in size to accommodate various engines and vaporizer/-pressure regulators. By suitable selection of proper proportioning orifices 50, 48, and 52, the net pressure in chamber 46 will be varied in accordance with various engine operating conditions to produce a resultant or "net" absolute pressure signal $P_v$. The signal $P_v$ is used to modify the position of a flow control valve 136 in vaporizer/pressure regulator 38 (FIG. 3) which is normally set by the suction $P_p$ pressure generated in the control valve 32 (FIG. 2) when inlet air is accelerated past the valve body 72 (which acts as an intake air flow restrictor in the inlet air duct) and flows past opening 121 at a reduced pressure (note the reduced flow area around valve body 72, and the expansion nozzle area just below the body). The suction pressure signal $P_p$, of course, is only transmitted when the valve element 102 is open, and varies in proportion to valve position and intake air velocity to call for varying amounts of supplemental gas fuel from the vaporizer/pressure regulator 38.

Figure 3:
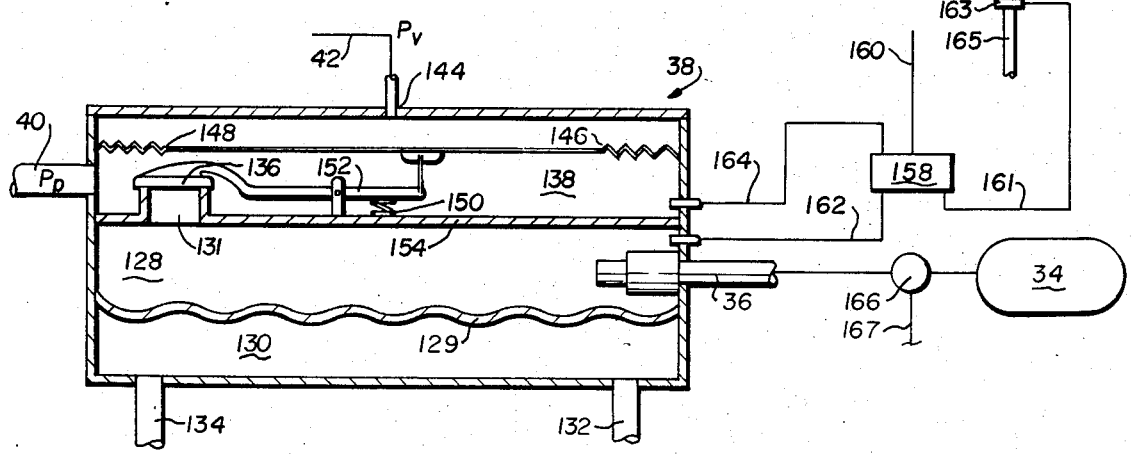
FIG. 3 is a side view, in cross section, of the vaporizer/pressure regulator used in the system of FIG. 1, with attached schematic representation of the connection to the dual fuel switching arrangement.

With reference to FIGS. 3, 4 and 5, the supply of supplemental gaseous fuel to the control valve via conduit 40 is normally regulated by the vaporizer/pressurizer 38 (hereinafter referred to as the vaporizer) under the primary control of suction pressure $P_p$. The vaporizer 38 is located between the supplemental fuel high pressure source 34 and the valve 32, as previously discussed. The supplemental fuel is introduced into a first pressure regulated heated chamber 128 via conduit 36, after passing through a first stage pressure reduction from the supply 34. The chamber 128 is in a heat exchange relation with chamber 130 which is in the circulatory flow path of the engine coolant. The engine coolant would, for example, enter through a conduit 132 and exit through a conduit 134 so as to supply heat to the supplemental fuel in chamber 128 by heat transfer through partition 129 separating chambers 130 and 128. The coolant heat vaporizes the fuel in chamber 128 and conditions it for supply to the intake air of the engine. A valve 136 is provided in a chamber 138 and serves as a second stage pressure regulator to regulate flow of the vaporized and heated supplemental fuel through the conduit 40 to the control valve 32 in response to intake air flow passing through valve 32 when the valve element 102 is opened.

Figure 2:
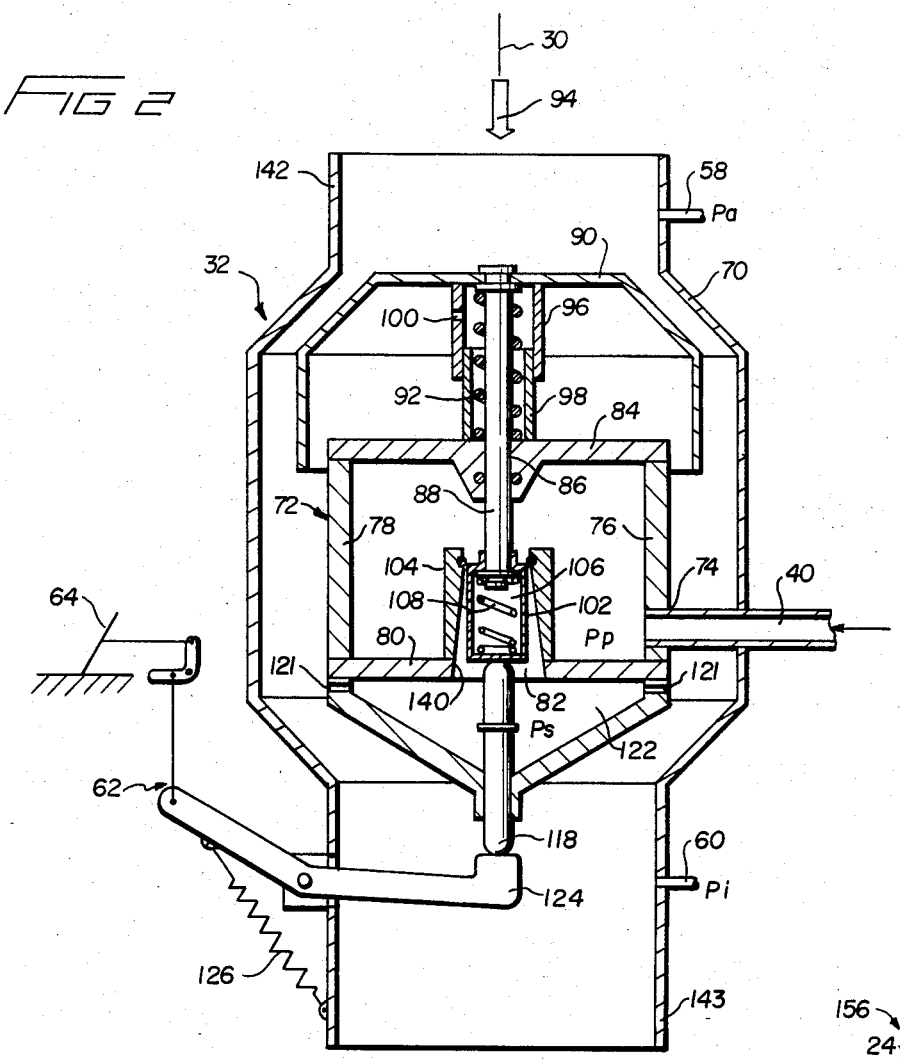
FIG. 2 is a side view, in cross section, of the improved control valve used in the system of FIG. 1.

With brief reference to FIG. 2, a lower chamber of the control valve 32 is shown at reference numeral 122. The outer region of the valve body 72 and the geometry surrounding the lower chamber 122 of the control valve 32 functions as a restriction and expansion nozzle in the intake duct 30 which generates a suction pressure signal $P_s$ in chamber 122 when inlet air 94 flows through the valve housing from inlet end 142 to outlet end 143. The pressure signal $P_s$ then, will be seen as representing an air flow velocity (i.e., mass rate of flow) signal resulting from inlet air flow around the valve body 72 and reaction member 90. Intake air pressure $P_s$ is transmitted from the intake airstream to chamber 122 via opening 121. When the valve element 102 has been moved off seat 114 by downward movement of control rod 88 (in a manner that will be described below) the supplemental fuel is drawn into chamber 122 from chamber 76 and exits through opening 121 and is delivered by conduit 45 to the compression side 18b of the turbocharger 18 (assuming an intake air pressurizer is used in the system). The suction pressure $P_s$ is also transmitted across the opening 140 of the valve so as to produce a suction pressure signal $P_p$ in the inlet supplemental fuel line 40 that is transmitted to the vaporizer 38 by line 40. The signal $P_p$ creates a suction in the chamber 138 of the vaporizer so as to call for a suitable amount of supplemental gaseous fuel through vaporizer valve 136. Accordingly, the enrichment of the moving airstream 94, through the control valve 32, with the supplemental gas fuel will be proportional to the quantity of air 94 moving through the air duct 142 of the control valve 32 so as to thereby maintain a desired air to supplemental fuel ratio.

With this mode of operation of the control valve explained in accordance with this invention, a supplemental or "fine tuning" control signal is also transmitted to vaporizer 38 to further control the motion or position of vaporizer valve 136. Specifically, a port 144 is provided in the vaporizer 38 for supplying the net control signal in the form of pressure $P_v$ through conduit 42 to the chamber 146 of the vaporizer 38. The chambers 138 and 146 of vaporizer 38 are separated by a diaphragm 148 that moves in response to absolute pressure differential across same. Motion of diaphragm 148 is transmitted to valve 136 by a lever arm linkage system 152 which is normally biased by a spring 150 to close the valve 136. A vacuum in chamber 138 will cause the diaphragm 148 to move down as viewed in FIG. 3 to depress the right side of lever 152 to open valve 136 against the bias of spring 150. The degree of vacuum (lower absolute pressure) in chamber 138 is determined by the suction pressure $P_p$ in line 40 in response to air flowing through the control valve 32, as explained previously.

The net control signal $P_v$ generated in chamber 46 of condition comparator 44 is transmitted to chamber 146 via open conduit 42 to modulate the normal gas fuel flow control effect produced by suction pressure signal $P_p$ to enable the basic valve and vaporizer to be used with different engines having different liquid fuel flow characteristics. It will be evident from looking at FIG. 3 that, if $P_v$ is a "positive" (higher absolute pressure than in chamber 128) pressure signal, the effect of $P_p$ in chamber 138 will be enhanced and the diaphragm 148 will be caused to move in a downward direction to a greater extent than if the suction pressure signal $P_p$ alone served as the sole control signal. The effect, therefore, of a positive pressure $P_v$ is to open valve 136 to a greater extent to cause additional enrichment of the intake air by providing an additional supply of supplemental fuel to the valve 32. On the other hand, if net pressure control signal $P_v$ is "negative" (low absolute pressure than in chamber 128), the reverse effect is obtained on control valve 136. If $P_v$ is substantially equal to $P_p$, no effect on diaphragm 148 will be obtained.

With reference to FIG. 4, a typical torque vs. RPM curve T for a modern commercial diesel engine is illustrated. In this example, the torque curve exhibits a peak torque at an intermediate RPM ($N_1$ RPM) to a lower value at maximum operational speed ($N_2$ RPM). Conversely, as engine RPM drops under load from maximum operational speed to the intermediate RPM, the torque output of the engine increases until maximum torque is reached at speed $N_1$. Such a curve is obtained by suitable engine governor control systems that automatically cause additional fuel to be supplied to the engine as its speed drops under load on the far side of the torque curve so that useful engine power output is maintained without the need for an operator to shift to a higher RPM operation range under load. Other engine torque curves can also be envisioned that would have a different shape from the curve T illustrated in FIG. 4. In each case, the liquid fuel supply for the specific engine involved has been programmed so that the supply of fuel is different, and may not be precisely linear under all operating conditions. This introduces a complication when it is desired to supply supplemental gas fuel to the engine intake duct in proportion to the supply of liquid fuel. It is not always possible to precisely design a single supplemental gas fuel mixer valve to accommodate all engine configurations with which the valve might be used. Accordingly, the present invention provides a condition comparator 44 intended to generate a net control signal $P_v$ that, in effect, "monitors" various engine operating conditions and superimposes an additional control signal on the suction signal $P_p$ in line 40 between the mixer valve 32 and the vaporizer 38 to enable a single mixer and vaporizer to be used for various engines.

Accordingly, with reference to FIGS. 1 and 5, in accordance with the preferred embodiment, a net control signal $P_v$ is generated by proportioning a pressure $P_e$ corresponding to the mass rate of flow of engine exhaust gas with pressures corresponding to intake duct signals $P_a$ and $P_i$. The comparator 44 as shown in FIG. 5 has a central pressure comparator chamber 46 which is connected to resticted, calibrated proportioning orifices 48, 50, 52 and port 54. The orifice 48 communicates with conduit 56 or 57 which supplies an exhaust rate of flow pressure signal $P_e$. Orifice 50 is connected to conduit 58, which provides a signal corresponding to reference intake duct pressure $P_a$ between the valve 32 and air cleaner 28. $P_a$ thus is essentially a reference pressure signal sensitive to any air cleaner restriction interference. Orifice 52 of the pressure comparator block 44 is connected to conduit 60 which receives signal $P_i$ from the intake duct at a point just below the control valve 32. Preessure $P_i$ will be responsive to the mass rate of air flow through valve 32 and the duct 45, and therefore is essentially proportional to engine speed, since the air is unthrottled. Port 54 of the comparator block 44 is connected by conduit 42 to the upper chamber 146 of the vaporizer 38. The net pressure in the comparator chamber 46 of the pressure comparator block 44 will therefore be seen as comprising a net pressure $P_v$ obtained by comparing the proportional flow through the aforementioned orifices from the above-identified pressure and suction sources. The net pressure $P_v$ inside the chamber 46 is communicated, via conduit 42, to the chamber 146 of the vaporizer to control the amount/pressure of supplemental fuel available to the control valve 32. The net pressure $P_v$ operates on the diaphragm 148 and linkage system 152 connected thereto so as to control movement of the valve 136.

Of course, effective signals $P_a$, $P_e$ and $P_i$ which are communicated to the comparator chamber 46 will vary from engine to engine. This variant as well as its actual utilization can be taken into account by the use of interchangeable or variable orifices 48, 52 and 54 whose openings may be varied so that the ratios between $P_i$, $P_a$, and $P_e$ will be suitably established to generate net control signal $P_v$. The generation of the net control signal $P_v$ is obtained, for example, by sensing the change of exhaust rate of flow as communicated by pressure $P_e$ which results from change of heat supplied by varying flow of diesel fuel to the engine, over the inlet airstream pressure signals $P_a$ and $P_i$, particularly intake air pressure signal $P_i$, which, if fuel is being added to the engine while speed is decreasing, for example will be increasing (in an absolute sense) as the speed of the engine decreases. The pressure signal $P_i$ taken just below the control valve 32 is normally proportional to the suction pressure $P_p$ when valve 102 is open, the latter drawing the supplemental fuel from the vaporizer 38. The proportioning orifices 48, 52, and 54 in the condition comparator block 44 therefore allow the condition comparator 44 to program or predetermine a net control signal $P_v$ output in line 42 to control the position of diaphragm 148 in chamber 146 of the vaporizer 38 in combination with suction pressure signal $P_p$. Although fixed proportioning orifices are shown in FIG. 5, variable needle valves or similar adjusting devices could be utilized to provide for adjustments of the net control signal $P_v$ to accommodate or fine tune the system for various engines.

With reference to FIGS. 2 and 6, the improved control valve 32 of the present invention is shown in greater detail. The control valve 32 is operatively connected to the input speed control 64 (acceleration) by a linkage system 62 which is controlled by positioning the speed controller 64. The speed controller 64 is also connected, via linkage 66, shown schematically in FIG. 1, to the governor control 68 for the diesel engine 12. The governor is connected to or associated with the fuel injection pump 26 in any well-known fashion to control output of the engine (engine speed demand). The valve 32 includes valve housing 70 which supports a central valve body 72 having an internal chamber 76 which communicates with the supplemental fuel inlet conduit 40. The chamber 76 when viewed in cross section, is defined by a vertically extending wall portion 78 and a horizontally extending ledge portion 80. The ledge portion 80 is provided with an opening 82, the purpose of which will be explained in more detail below. The top of the valve body 72 is closed by a valve body cover 84. The valve body cover 84 is provided with a central aperture 86 and slidably receives therein a rigid control rod 88. The valve body cover portion 84 may be secured to the vertically extending wall portions 78, of the valve body 72, by any known manner which ensures a tight seal.

The rigid control rod 88 is connected, at its uppermost end, to an air flow reaction menmber 90, which is spring biased by a spring 92 in a direction away from the valve cover element 84, or in opposition to the air flow direction indicated by arrow 94. Concentrically located with respect to the rigid control rod 88 and spring 92 is a close fitting, telescoping set of tubular elements 96, 98 which define a fluidic motion damper mechanism. A small orifice 100 is provided in tube 96 so as to restrict air flow into and out of the air chamber within the telescoping tubes. The orifice could be located in either of the tubular elements 96, 98, of course, and the biasing spring 92, of the air flow reaction member 90, could be located inside or outside the telescoping set of tubular elements 96, 98. Moreover, any desirable sealing arrangement could be provided between the telescoping elements. Also, the inner tubular element 98 could be a closed cylinder, to limit air volume between the tubes. The rigid control rod 88 is fixedly secured to the air flow reaction member 90 for movement therewith. The damper illustrated is a preferred embodiment and any suitable damper structure could be utilized. For example, the air bleed orifice could be provided in a piston element within a sealed tube, or the like, similar to a shock absorber.

As best illustrated in FIG. 6, the opposite end of the rigid control rod 88 is connected to the cylindrical plug valve element 102 of the control valve by a lost motion connection, and the valve 102 reciprocates in a tapered valve seat 110 in the outer valve housing 104 which extends upwardly from the horizontal ledge portion 80 of the valve body 71. The rigid control rod 88 is connected with the valve 102, which is a hollow cylindrical element having an inner chamber 106, in such a manner as to be slidably mounted through the upper or proximal wall thereof. An enlarged stop means 107 at the end region of rod 88 engages the underside of the axially upper wall of plug element 102 in a closing direction. A spring 108 connected between the stop 107 and the distal or axially lower wall of plug element 102 biases the rigid control rod against the upper wall portion of the interior chamber 106. The upper, external edge 112 of the valve element 102 seats against an O-ring seal 114 that has an inner clearance that is smaller than the outer diameter of the body 102. The orifice 110 is tapered outwardly as it approaches the lower opening 82.

A lost motion connection is provided between the control rod 88 and the sliding valve element 102 because of the sliding arrangement between the control rod 88 and the valve element 102 on the one hand, and the spring 108 between the control rod 88 and the valve element 102, on the other hand. The valve element 102 is normally held in a closed position by the spring 92 which biases the air flow reaction member and rod 88 against the incoming air flow direction indicated at 94. However, motion of rod 88 downwardly opens valve 102 via the spring 108, which seats against a bottom wall of chamber 106.

A plunger 118 is connected to the speed controller 64 of the engine so that the hollow sliding valve element 102 is normally moved towards the closed position as the throttle actuator approaches the idle position, and the valve element 102 is fully closed when the throttle actuator is an idle or off position. This feature keeps the valve 102 closed at starting, idle and coasting conditions, without interfering with movement of the air flow responsive member.

The plunger 118 is controlled by a lever arm 124 which is biased by a spring 126 towards the closed position when the speed controller 64 is placed in an idle position. The lever 124 is connected to the speed controller 64 by the linkage system 62. Therefore, the sliding, hollow valve element 102 is progressively closed as the speed controller 64 nears the idle position and is completely closed at idle so as to prevent the introduction of the supplemental fuel into the portion 122 of valve body 72, irrespective of the position of air flow responsive member 90.

Accordingly, the valve element 102 is operatively connected to the air flow reaction member 90 through the damper arrangement 96, 98, control rod 88 and spring means 108. The connection of the control valve element 102, to the damper arrangement 96, 98 ensures smoother operation of the valve element 102 by the controlled compression and expansion of air between the telescoping set of tubular elements 96, 98. Thus, sudden motion of the air flow reaction member 90 is resisted by the above-described controlled compression and expansion of air or upon the sudden occurrence of engine speed changes. As such, it can be seen that motion of the air flow reaction member 90 will lag behind the operating forces of the airstream moving through valve 32. This will result in the earlier closing of vaporizer valve 136.

With reference to FIG. 3, an additional aspect of the present invention is also set forth. This is an additional control system, generally indicated by reference numeral 156, which automatically restores full diesel fuel flow to the engine when the supplemental fuel supply is depleted. An air operated solenoid 158 utilizes compressed air from, for example, an engine driven air compressor (not shown). The air compressor is connected by conduit 160 to the air solenoid 158. When suitable pressure of supplemental gas fuel generates a suitable pressure in chamber 128 of the vaporizer 38, a pressure differential signal is communicated to the air solenoid 158 via lines 162, 164 due to the pressure differential in chambers 128, 138 across valve 136. The air solenoid controls pressure from line 160 to line 161 and, when a suitable pressure differential is present, actuates a device 163 for reducing full flow of diesel fuel to the engine while gas fuel is supplied. The device 163, for example, is a bypass valve or the like on the liquid fuel supply line 24, or other suitable device that normally allows full diesel or primary fuel flow until a suitable pressure differential is available in lines 162, 164. Adequate pressure differential opens the bypass or reducer 163 to permit bypass of some fuel to bypass line 163 for return to the fuel tank, and loss of pressure differential closes or nullifies the same. Line 161 could also be a direct mechanical link, if desired, actuated by the solenoid 158 or by the air pressure in line 160, or any other suitable actuator. Valve 166 normally is opened by vacuum upon engine start up to supply gas fuel to chamber 128. The operating vacuum for valve 166 can be supplied via line 167, which, at its other end, communicates with a low pressure area in the engine intake manifold. While only a bypass type fuel reducer is shown, it should be understood that other arrangements for reducing fuel liquid fuel flow could be used, including governor and pump controllers.

The operation of the supplemental fuel control system will now be explained. Upon start-up of engine 12, the speed controller element 64 is in the idle position, which will result in plunger 118 urging valve element 102 into the closed position. After start-up and while idling, plunger 118 maintains the valve 102 in the closed position although the air flow responsive member 90 may be opened slightly, depending upon engine RPM and engine operating characteristics. As the speed controller is moved to advance engine speed, the air flow responsive member 90 further reacts by moving downwardly as viewed in FIG. 2 and compression of spring 108 in valve element 102 by actuator rod 88 becomes effective to bias valve 102 towards an open position. As the plunger 118 retracts away from valve 102, the force transmitted by spring 108 will cause the valve element 102 to open and admit supplemental fuel into the chamber 76 of the valve body 72 via the conduit 40. The rate of flow of supplemental fuel through conduit 40 will be regulated by the vaporizer 38 in response to the suction pressure $P_p$ that is generated by air flowing over the valve body 72 and around the air flow responsive member 90. As the plunger 118 moves entirely away from the valve 102 during normal engine operation above idle, the position of the air flow responsive member 90 and the suction pressure $P_p$ will determine the amount of supplemental fuel supplied to the engine intake airstream at various engine operating conditions.

The motion damper 96, 98 will damp sudden accelerations of the air flow responsive member 90 in response to rapid changes of air speed to smoothen the operation of the valve element 102 and to prevent the air flow responsive member from closing too rapidly when the engine speed suddenly decreases. This will permit the intake manifold pressure to stay higher (absolute pressure) to cause vaporizer valve 136 to close sooner, thereby saving gas fuel when it is not required. The damper 96, 98 also stabilizes movement of the valve element 102 against undesirable oscillations caused by movement of the airstream over the air reaction member and other influences.

The closing movement of valve element 102 is caused by the plunger 88 seating against the upper wall of the interior chamber 106 of valve element 102 to cause the valve to move to a closed position as the air flow responsive member 90 is biased towards an upward position against the flowing airstream by spring 92.

The condition comparator block 44 functions at all times to generate a control signal $P_v$ to modulate the position of the diaphragm 148 in the vaporizer 38 to further increase or decrease the flow of supplemental fuel in response to operating parameter of a particular engine.

Proportioning orifices in the pressure comparator block 44 are variable and are selected for a specific engine so that a resultant net control signal $P_v$ will be obtained to adjust gas fuel flow to match the flow of primary diesel fuel supply during various operating conditions of different engines. For example, for engines having typical torque characteristics, the orifices may be selected so that, in the engine operating regime from $N_1$-$N_2$ the increase in exhaust rate of flow communicated by pressure signal $P_e$ over intake duct pressure signal $P_i$ as compared with the reference inlet duct pressure signal $P_a$ will be sensed as an indication of increased liquid fuel flow without corresponding engine speed increase and the resultant pressure signal $P_v$ will be utilized as a positive pressure signal to further depress the diaphragm 148 to open the vaporizer valve 136 an additional amount beyond that which would normally be called for as a result of the primary suction pressure signal $P_p$ operating alone. Full power output of the engine can thus be assured under such conditions. Under different operating conditions, on the other hand, the orifices 48, 51, and 54 can be proportioned to produce a resultant signal in comparator chamber 46 of comparator block 44 that will generate a net pressure control signal $P_v$ that is virtually neutral, in the sense that it will not exert any effect on diaphragm 148 that will be superimposed over the motion thereof created by the suction pressure signal $P_p$ acting alone. Under still other operating conditions, it may be desired to further lean out the supplemental fuel to a greater extent than what would normally occur as a result of the suction pressure signal $P_p$ acting alone, in which case the orifices could be arranged to produce a net pressure signal $P_v$ that would be a negative pressure to cause motion of the diaphragm 148 in a direction tending to close the vaporizer valve 136. Thus, the pressure comparator block 44 serves to automatically and passively monitor engine operating conditions and to modulate the normal flow of supplemental fuel to the valve 32 in response thereto.

When the supply of supplemental fuel is depleted to the extent that adequate pressure of same cannot be maintained in the vaporizer 38, the automatic cutoff system 156 becomes operational and restores full flow of primary fuel to the engine by utilizing an automatically operating valve system responsive to low pressure of supplemental fuel.

Various modifications within the knowledge of a person skilled in the art could be made to the invention without departing from the spirit and scope of same, which are defined in the following claims. For example, while the preferred embodiment uses direct pressure to communicate exhaust rate of flow, reference and intake air rate of flow conditions, it is possible to use suitable transducers at the same information source areas that would communicate suitable signals containing the same information to the condition comparator 44, which would process and proportion the incoming signals to produce a net control signal corresponding in information content to pressure signal $P_v$. The net control signal, of course, could be used in any desired manner to modulate the final position of the pressure regulator valve in conjunction with the main control pressure signal $P_p$. It is to be understood that various modifications within the realm of a person skilled in the art could be made to the disclosed embodiment without departing from the spirit and scope of the invention, which is set forth and defined in the claims below.

What is claimed is:

1. A control valve for a supplemental fuel supply to an internal combustion engine provided with a primary liquid fuel supply, comprising a valve housing provided with an air duct extending the length of the housing and having inlet and outlet ends; a movable air flow responsive member in said duct responsive to air flowing through said duct towards said outlet end so as to be deflected in a first direction in response to such air flow; means for resiliently biasing said air flow responsive member in a direction opposite to said first direction; a supplemental fuel inlet in said housing; a supplemental fuel passageway in said housing to provide communication between said supplemental fuel inlet and said air duct at a point between said air flow responsive member and the outlet end of said duct; a valve element for controlling said supplemental fuel flow through said passageway, said valve element movable between closed and open positions in response to the movement of said air flow responsive member between undeflected and deflected positions, respectively, said valve element being movable between said open and said closed positions independently of said air flow responsive member; and fluidic damper means for damping the motion of said air flow responsive member.

2. A control valve as claimed in claim 1, said valve element comprising a cylindrical plug and a tapered orifice, said cylindrical plug rectilinearly movable axially within said orifice to vary the valve opening in response to motion of the air flow responsive means.

3. A control valve as claimed in claim 1, said fluidic damper comprising a telescoping pair of tubular elements providing a variable volume fluid chamber between the elements, and an orifice in one of the elements for restricting air flow into and out of the chamber; one of said elements connected to the air flow responsive member and a remaining one of said pair being fixed relative to the housing.

4. A control valve as claimed in claim 3, wherein said means for resiliently biasing said air flow responsive member is a compression spring disposed within said chamber between said tubular elements.

5. A control valve for controlling a supplemental fuel supply to an air intake duct of an internal combustion engine provided with a primary liquid fuel supply, comprising a valve housing provided with an air duct in communication with said air intake duct extending the length of the housing and having inlet and outlet ends; a movable air flow responsive member in said duct and responsive to air flowing through said duct toward said outlet end so as to be deflected in a first direction in response to such air flow; means for resiliently biasing said air flow responsive member in a direction opposite to said first direction; a supplemental fuel inlet in said housing; a supplemental fuel passageway in said housing for receiving supplemental fuel; a valve element for controlling supplemental fuel flow through said passageway, said valve element movable between closed and open positions in response to the movement of said air flow responsive member between undeflected and deflected positions, respectively, and said valve element being movable between said open and said closed positions independently of said air flow responsive member by means of a lost motion connection that permits said valve element to move towards an open position when said air flow responsive member is deflected but positively drives the valve towards a closed position when said air flow responsive member is moved into said undeflected position; said valve element comprising a plug element connected to the air flow responsive member by said lost motion connection and being rectilinearly movable axially within an orifice, said plug and orifice arranged so that movement of said plug relative to the orifice causes the valve opening to vary; said lost motion connection including a control rod having a first end connected to said air flow responsive member and a second end connected to said plug element so that said control rod can move independently of said plug element when said control rod moves in one direction in response to said deflection of said air flow responsive member, but engages and carries said plug element when said control rod is moved in an opposite direction; said plug element including an interior volume with opposed axial ends; said second end of said control rod extending through a proximate wall of said plug element and engageable with one of said axial walls within said volume, and including stop means on said second end for engaging said plug element in a valve closing direction; and spring means connected between said second end of said control rod and a part of the plug element within said interior volume of said plug element for resiliently urging said plug element in a valve opening direction when the control rod moves in the opening direction.

6. A control valve as claimed in claim 5, including a moveable throttle for the internal combustion engine, and means responsive to throttle position for urging said plug element towards a closed position when the throttle is at and approaches a closed position without effect upon the air flow responsive member.

7. A control valve as claimed in claim 5, said plug element seating against an annular seal means disposed within said tapered orifice when the valve is in a closed position.

8. A control valve as claimed in claim 7, said seal means comprising an O-ring.

* * * * *